Oct. 17, 1961  A. P. WICKEN  3,004,789
FLOORLESS CAMPING TRAILER
Filed Oct. 5, 1959  2 Sheets-Sheet 1

INVENTOR
ALLAN PERCY WICKEN
By Linton and Linton, ATTORNEYS

Oct. 17, 1961

A. P. WICKEN 3,004,789

FLOORLESS CAMPING TRAILER

Filed Oct. 5, 1959

INVENTOR
ALLAN PERCY WICKEN
By Linton and Linton
ATTORNEYS

United States Patent Office 3,004,789
Patented Oct. 17, 1961

3,004,789
FLOORLESS CAMPING TRAILER
Allan Percy Wicken, 223 Salvado Road, Wembley,
Western Australia, Australia
Filed Oct. 5, 1959, Ser. No. 844,299
8 Claims. (Cl. 296—23)

This invention relates to improvements in trailers provided with a roof and adapted for towing behind a motor vehicle or the like.

The object of the invention is to provide a lightweight roofed trailer of more or less normal dimensions which can be drawn by a motor vehicle or the like and which can be used by travellers with a minimum of inconvenience.

In one form the invention resides in a roofed trailer having a passage extending from the rear towards the front, the ground forming the floor of the passage at least towards the rear to enable an adult to walk into the trailer at ground level, and an opening at the front so that air passes through the passage when the trailer is in motion.

The various features of the invention will be better understood by reference to the following description of the embodiments shown in the accompanying drawings, wherein.

Figure 1:
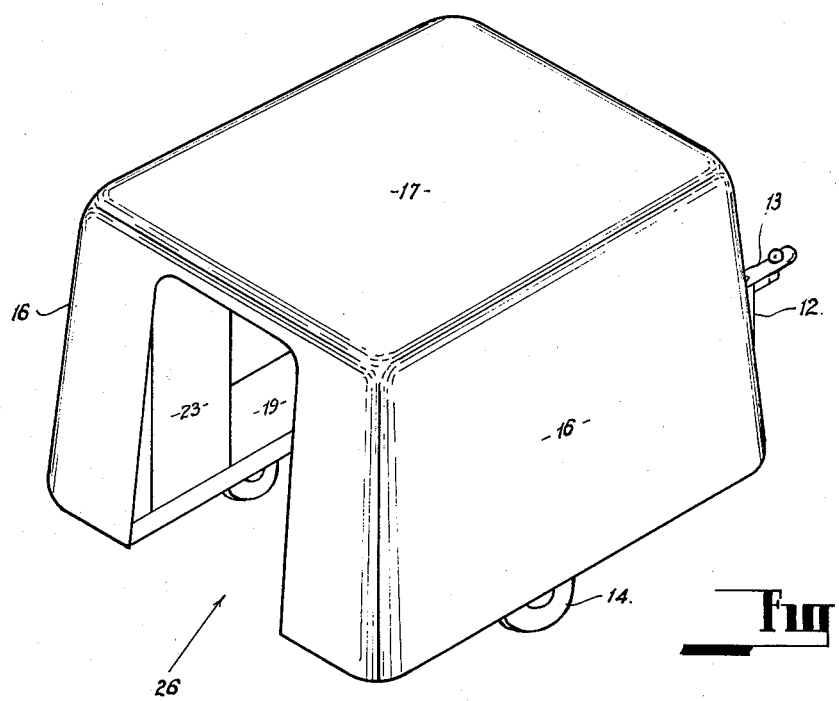
FIG. 1 is a perspective view from the rear of a trailer constructed in accordance with the invention.
Figure 2:
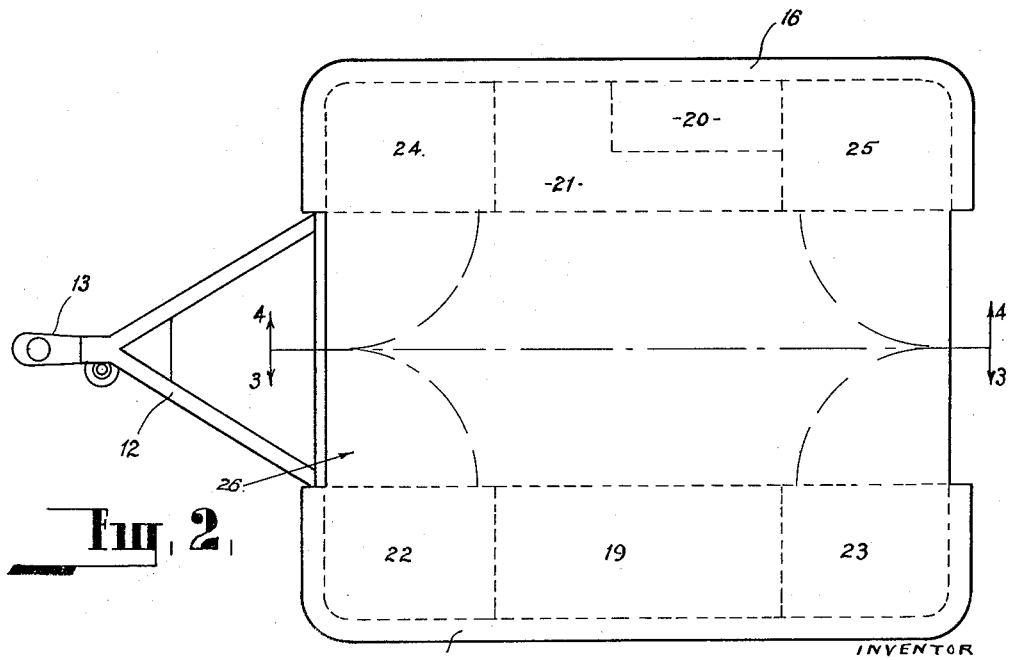
FIG. 2 is a diagrammatic plan view of the trailer shown in FIG. 1.
Figure 3:
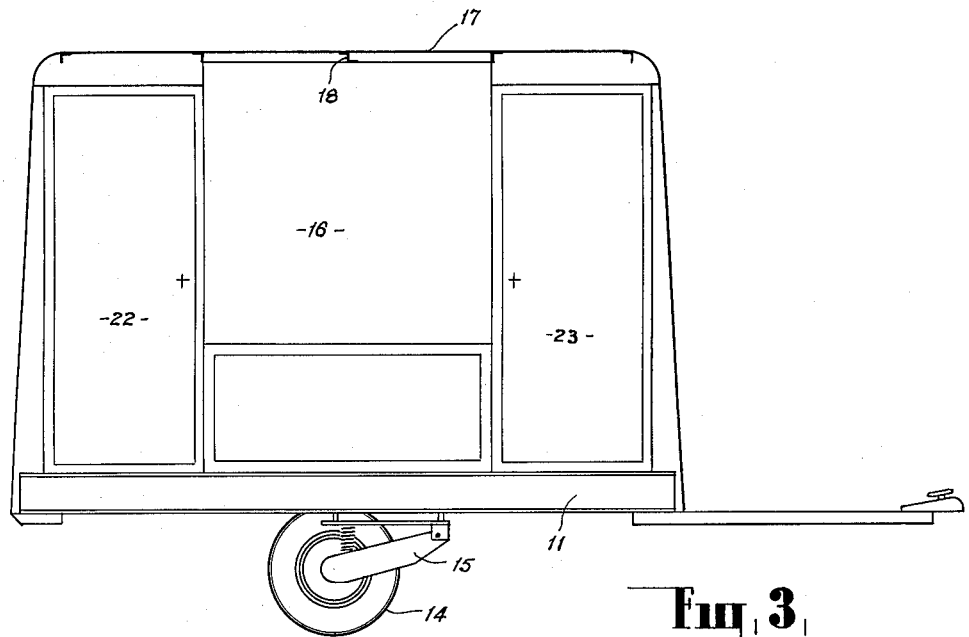
FIG. 3 is a sectional elevation on line 3—3 of FIG. 2.
Figure 4:
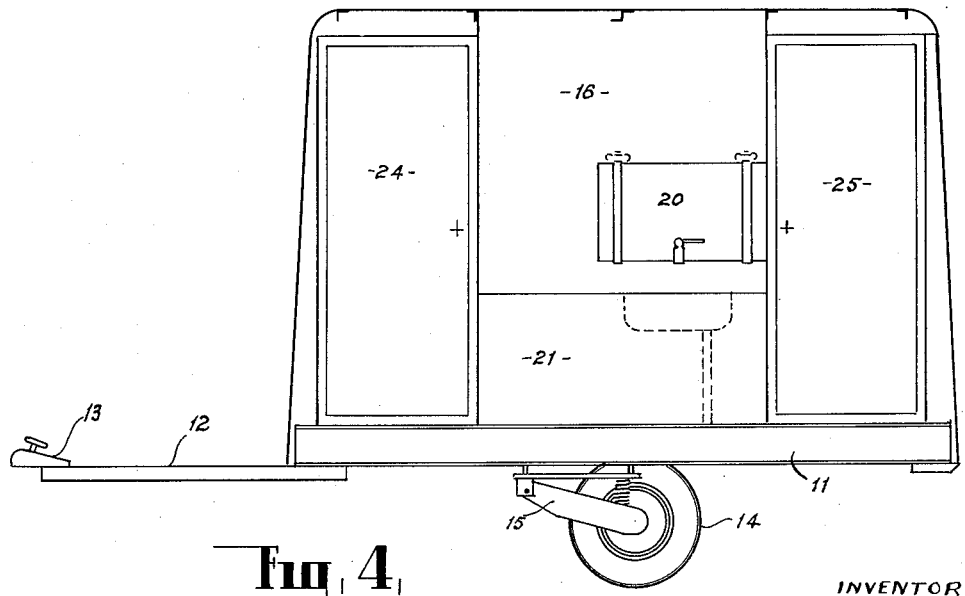
FIG. 4 is a sectional elevation on line 4—4 of FIG. 2.

Referring now to the drawings, the chassis 11 is substantially U-shaped in plan and is provided with a forwardly projecting triangular tow bar 12 fitted at the apex with any suitable mechanism 13 for connecting the trailer to a motor vehicle. Each of the arms of the chassis is supported by a wheel 14 mounted on any suitable type of independent suspension 15. The side walls 16 of the trailer extend upwardly from the arms of the chassis and are joined at the top by a roof 17 which may be supported by rib members 18. Many fittings normally found in caravans are fixed to the side walls of the trailer, the heavier fittings such as a refrigerator or ice chest 19 and water tank 20 and sink bench 21 being centrally disposed over the wheels, while the lighter fittings such as cupboards 22, 23, 24 and 25 are positioned towards the end of the trailer. The passage 26 formed between the fittings fixed to the walls of the trailer extends from the rear to the front and is open at each end, thus ensuring a minimum of wind resistance as the trailer is moved forward and assisting in the elimination of the entry of road dust. The ground immediately below the trailer forms the floor of the passage so that an adult can walk into the trailer with ready access to the fittings. If desired, the front and rear ends of the passage may be fitted with removable screens made from canvas or other suitable material. Alternatively the doors of the front and rear cupboards 22 and 24 and 23 and 25 disposed on each side of the passage may be so constructed that when open they will close the front and rear ends of the passage, enabling it to be used as a dressing room or to provide protection from the weather. If desired, hinged or sliding doors may be provided for the same purpose.

Such a trailer is very convenient to use and is particularly suitable for use in conjunction with the type of motor vehicle known as a "Station Sedan." The main sleeping arrangements are carried in the station sedan or other vehicle. When it is desired to prepare a meal, it is only necessary to walk into the trailer through the rear end of the passage and proceed with the necessary preparations. No setting up is necessary. A floor of tow bar height may be placed in position in the passage if supplementary sleeping accommodation is required.

The fact that the passage is accessible at ground level ensures that the height of the trailer is lower than that of any normal caravan and little more than that of the average motor vehicle. If desired, the front portion of the passage may be provided with a permanent floor which does not extend sufficiently far towards the rear to prevent access to the passage at ground level from the rear. If desired, the trailer may be fitted with hinged, sliding or removable members which when placed in position form a floor. A step may be fitted to the tow bar 12 adjacent the front of the trailer so that it is possible to step into the station sedan from the trailer.

While the invention has been described with reference to one specific embodiment, it is not limited thereto. Modifications are possible. For example the wheels of the vehicle may be connected by a transverse axle so positioned that it does not materially affect access to the passage. When the front portion of the passage is fitted with a permanent floor, the axle may be disposed under the floor. Preferably the axle may be of the trailing arm type.

Also, instead of the trailer being provided with an opening such as a doorway at the front, it may be provided with a window or other like opening to admit an appropriate flow of air to prevent the entry of road dust as the trailer is moving along.

I claim:

1. A substantially floorless roofed open front camping trailer comprising a substantially U-shaped chassis open at the rear and provided at the front with a draw bar, wheels fitted to each arm of the chassis, side walls projecting upwardly from each arm of the chassis and a roof connecting the upper edge of the side walls, the interior of the side walls being fitted with facilities for the storage of camping and cooking gear and clothing, which facilities are accessible to a person standing on the ground between the side walls.

2. A substantially floorless roofed camping trailer comprising a substantailly U-shaped chassis open at the rear and provided at the front with a draw bar, wheels fitted to each arm of the chassis, side walls projecting upwardly from each arm of the chassis, a front end wall projecting upwardly from the transverse portion of the chassis and a roof connecting the upper edges of the side walls and the front end wall, the interior of the side walls and the front end walls being fitted with facilities for the storage of camping and cooking gear and clothing, which facilities are accessible to a person standing on the ground between the side walls and the front end wall being provided with at least one opening through which air passes into the trailer as the trailer is being drawn along.

3. A substantially floorless roofed open front camping trailer comprising a substantially U-shaped chassis open at the rear and provided at the front with a draw bar, wheels fitted to each arm of the chassis, side walls projecting upwardly from each arm of the chassis and a roof connecting the upper edge of the side walls, the interior of the side walls being fitted with at least one cupboard adjacent the rear of the trailer, the door of the cupboard being so dimensioned that it will close the rear of the trailer when in the open position.

4. A substantially floorless roofed open front camping trailer comprising a substantially U-shaped chassis open at the rear and provided at the front with a draw bar, wheels fitted to each arm of the chassis by an independent suspension, side walls projecting upwardly from each arm of the chassis and a roof connecting the upper edge of the side walls, the interior of the side walls being fitted with facilities for the storage of camping and cooking gear and clothing, which facilities are accessible to a person standing on the ground between the side walls.

5. A substantially floorless roofed open front camping trailer comprising a substantially U-shaped chassis open at the rear and provided at the front with a draw bar, wheels fitted to an axle positioned transversely of the arms of the chassis adjacent the forward end thereof, side walls projecting upwardly from each arm of the chassis and a roof connecting the upper edge of the side walls, the interior of the side walls being fitted with facilities for storage of camping and cooking gear and clothing, which facilities are accessible to a person standing on the ground between the side walls and between the rear end of the chassis and the axle.

6. A substantially floorless roofed open front camping trailer comprising a substantially U-shaped chassis open at the rear and provided at the front with a draw bar, wheels fitted to each arm of the chassis, side walls projecting upwardly from each arm of the chassis and a roof connecting the upper edge of the side walls, the interior of the side walls being fitted with cupboards, water supply tank, sink, ice chest, refrigerator and other components for the storage of camping and cooking gear and clothing, which components are accessible to a person standing on the ground between the side walls.

7. A substantially floorless roofed open front camping trailer comprising a substantially U-shaped chassis open at the rear and provided at the front with a draw bar, wheels fitted to each arm of the chassis, side walls projecting upwardly from each arm of the chassis, and a roof connecting the upper edge of the side walls, the interior of the side walls being fitted with facilities for the storage of camping and cooking gear and clothing, which facilities are accessible to a person standing on the ground between the side walls and means for closing the open front and rear of the trailer when at rest.

8. A substantially floorless roofed open front trailer as claimed in claim 7 wherein the closing means comprise the doors of cupboards positioned on the side walls adjacent the front and rear of the trailer.

References Cited in the file of this patent

UNITED STATES PATENTS

| | | |
|---|---|---|
| 1,548,527 | Hillgren | Aug. 4, 1925 |
| 2,048,580 | Webber | July 21, 1936 |
| 2,379,094 | Maxon | June 26, 1945 |
| 2,828,034 | Carlson | Mar. 25, 1958 |

FOREIGN PATENTS

| | | |
|---|---|---|
| 447,927 | Great Britain | May 28, 1936 |